United States Patent [19]
Haase

[11] Patent Number: 6,136,193
[45] Date of Patent: Oct. 24, 2000

[54] PROCESS OF BIOTREATING WASTEWATER FROM PULPING INDUSTRIES

[76] Inventor: Richard Alan Haase, Suite 422, 15700 Lexington Blvd., Sugarland, Tex. 77478

[21] Appl. No.: 09/114,534

[22] Filed: Jul. 13, 1998

Related U.S. Application Data

[63] Continuation-in-part of application No. 08/707,852, Sep. 9, 1996, abandoned.

[51] Int. Cl.⁷ .................................................. C02F 3/30
[52] U.S. Cl. ...................... 210/605; 210/611; 210/620; 210/630; 210/916; 435/262
[58] Field of Search .................................. 210/605, 610, 210/611, 620, 630, 916; 435/262, 262.5, 264

[56] References Cited

U.S. PATENT DOCUMENTS

| | | | |
|---|---|---|---|
| 3,376,219 | 4/1968 | Silvey | 210/11 |
| 3,915,853 | 10/1975 | Luck | 210/611 |
| 4,039,438 | 8/1977 | Anderson | 210/11 |
| 4,537,682 | 8/1985 | Wong-Chong | 210/611 |
| 4,605,502 | 8/1986 | Hata | 210/611 |
| 4,666,606 | 5/1987 | Heinicke | 210/632 |
| 4,673,505 | 6/1987 | Wong | 210/611 |
| 4,737,289 | 4/1988 | Castaldi et al. | 210/611 |
| 4,790,940 | 12/1988 | Castaldi et al. | 210/611 |
| 4,880,542 | 11/1989 | Sublette | 210/611 |
| 5,228,995 | 7/1993 | Stover | 210/603 |
| 5,269,929 | 12/1993 | Sublette et al. | 210/610 |
| 5,288,407 | 2/1994 | Bodwell et al. | 210/630 |
| 5,366,633 | 11/1994 | Buisman | 210/614 |
| 5,403,487 | 4/1995 | Lodaya et al. | 210/610 |
| 5,449,460 | 9/1995 | Buisman | 210/605 |
| 5,474,682 | 12/1995 | Buisman | 210/610 |
| 5,480,550 | 1/1996 | Sublette | 210/611 |
| 5,681,470 | 10/1997 | Safi | 210/603 |
| 5,705,072 | 1/1998 | Haase | 210/605 |

FOREIGN PATENT DOCUMENTS 8801009  4/1988  Netherlands ...................... C02F 3/02

*Primary Examiner*—Christopher Upton
*Attorney, Agent, or Firm*—Felsman, Bradley, Vaden, Gunter & Dillon; Sue Z. Shaper

[57] ABSTRACT

This invention provides a process for the biotreatment of wastewater from pulping industries. Sulfides are removed by a number of strains of bacteria from the genus Thiobacillus or *Thiobacillus denitrificans*. COD and BOD are concurrently removed with the sulfides by an improved co-cultural blend comprising co-cultures of a number of strains of the Thiobacillus or *Thiobacillus denitrificans* bacteria with heterotrophs. At least approximately 20%, and preferably between approximately 40% and approximately 60%, of the improved co-cultural blend comprises the co-cultures of a number of strains of the Thiobacillus or *Thiobacillus denitrificans* bacteria with the heterotrophs. Acclimation of the heterotrophs to the species to be removed is accomplished with biological acclimation reactors which reduce mycell toxicity for the heterotrophs. To control pH of the heterotrophic reaction with inorganic and organic sulfides, magnesium oxide (MgO) is utilized along with caustic. Ammonia and phosphate are available to the heterotrophs and to the Thiobacillus or *Thiobacillus denitrificans* bacteria by chemical addition.

24 Claims, No Drawings

6,136,193

PROCESS OF BIOTREATING WASTEWATER FROM PULPING INDUSTRIES

This application is a continuation-in-part of application Ser. No. 08/707,852, filed on Sep. 9, 1996, now abandoned.

BACKGROUND OF THE INVENTION

1. Field of the Invention

This invention relates to a process of biotreating wastewater from pulping industries to remove or significantly reduce sulfides.

2. Description of the Prior Art

Natural fibers play an essential role in the operation of innumerable industries. These industries include, but are not limited to, wood pulp bleaching facilities, general pulp processing facilities and natural fiber processing facilities. Developing said natural fibers, in order to achieve a stage of marketability, usually requires a process (referred to as a pulping process), in which water is utilized as a transporting medium.

During the pulping process, naturally existing sulfur compounds, such as sulfides, are released into the water. (Mercaptans have comparable characteristics to sulfides and, unless otherwise specified, the statements made hereafter in reference to sulfides would be applicable to mercaptans as well.) While the sulfide-containing wastewater is sent to or is in a biological treatment system, some sulfides are released into the atmosphere. The concentration of numerous sulfidic species, in the atmosphere, above and below their odor threshold is toxic to human and to animal life. The presence of sulfides in wastewater has other adverse consequences as well. One such adverse consequence is the development of a chemical oxygen demand (COD), resulting in oxygen depletion in the receiving water after discharge of the wastewater and, thus, leading to environmental pollution and/or levies, toxic effects and serious stench. The odor is extremely objectionable and is related to the chemical characteristics of sulfides. Further, release of the sulfur-containing effluent water streams of the pulping industry into the environment endangers aquatic life. Potential regulatory changes may result in more stringent controls and increased costs and may require the pulp and paper industry to substantially reduce the constituents in its effluent streams.

Ideas for treatment of the wastewater from the pulping processes have been proposed. However, said ideas have been neither aimed at nor capable of removing sulfides from wastewater streams of pulping processes.

In determining economical and efficient solutions for the removal of sulfur-containing compounds, several factors should be considered. Generally, two types of methods are available for the removal of sulfur-containing compounds: physicochemical treatments and biological treatments. Physicochemical treatments (including peroxygens-caustics electrodialysis and reverse osmosis) are expensive and produce large streams of wastewater. Wastewater treatment processes for the removal of sulfides, biological oxygen demand (BOD), COD, total Kjeldahl nitrogen (TKN) and ammonia by utilizing bacteria are generally known. The wastewater could be treated under either aerobic (including anoxic) or anaerobic conditions. (In order to facilitate reference, an aerobic or aerated condition or system would include an anoxic case as well unless otherwise specified.) To remove BOD, COD, TKN and/or ammonia, many municipal and industrial facilities apply bacteria either in a single-pass aerated treatment system utilizing tanks, ponds or film reactors or in a multi-step process performed in an aerated activated sludge system.

Several patents have been issued, mostly in the past decade, that are focused on biotreatment of wastewater.

Sublette, U.S. Pat. No. 5,480,550, issued on Jan. 2, 1996, patents a biotreatment process of caustic waste streams containing inorganic sulfides to effect neutralization of the caustic and oxidation of sulfides to sulfate. The process is based on the contact of the caustic streams with mixed, flocculated cultures of a sulfide-oxidizing bacterium from the genus Thiobacillus and various heterotrophs. Being premised on the treatment of caustic waste streams that only contain inorganic sulfides, this process considers neither wastewater of lower pH nor the removal of organic sulfides nor streams containing both organic and inorganic sulfides.

Castaldi et al., U.S. Pat. No. 4,790,940, registered on Dec. 13, 1988, and U.S. Pat. No. 4,737,289, registered on Apr. 12, 1988, patent a process for treatment of wastewater with a combination of Thiobacillus and denitrifying bacteria. The Castaldi patents essentially claim: treating wastewater containing free cyanide to destroy the free cyanide content by treating the wastewater with polysulfide under alkaline conditions, adjusting the pH and treating the resulting wastewater with a treating agent consisting essentially of cultures of bacteria of the genus Thiobacillus in combination with denitrifying bacteria.

Hata, U.S. Pat. No. 4,605,502, registered on Aug. 12, 1986, patents methods for purifying water or water-containing material using microorganisms and living bacterial preprarations as well as method for preparing and storing same. The method comprises contacting the water or water-containing material with a bacterial composition comprising one or more bacterial strains.

The above-listed patents and many other similar inventions have been developed, some of which still exist in the market. Although many different issues have been solved by previously- and presently-existing biotreatment processes, no biotreatment process has strived towards removal of potentially high concentrations of sulfides from the effluent water streams from pulping processes.

The major differences between the present invention and existing patents are in the steps of the process and in the sources of the number of strains of bacteria. In Sublette (U.S. Pat. No. 5,480,550), an autotrophic bacteria is first immobilized by co-culture with at least one floc-forming heterotroph. Then, the co-cultures of the number of strains of bacteria with heterotrophs are suspended in a mineral salt medium sufficient to support growth of the autotrophic bacteria. Finally, the aqueous caustic solution is added to the suspension. In the present invention and in Sublette, co-cultures of a number of strains of bacteria with heterotrophs are used. However, in the present invention, a number of strains of bacteria and co-cultures of a number of strains of bacteria with heterotrophs are simultaneously and additionally applied to wastewater. In Sublette, first, the co-cultures of the number of strains of bacteria with heterotrophs are suspended in a mineral salt medium sufficient to support growth of the autotrophic bacteria. Then, the aqueous caustic solution (wastewater) is added to the suspension. Therefore, in the present invention, as a first source of bacteria, a number of strains of bacteria and, as a second source of bacteria, co-cultures of a number of strains of bacteria with heterotrophs are added simultaneously to the wastewater, while in Sublette wastewater is added to co-cultures of bacteria that are in a mineral salt suspension that allows growth of bacteria. The final product may be wastewater including a number of strains of bacteria and co-cultures of a number of strains of bacteria. However, Sublette and the present invention provide different steps in obtaining that final product.

In Hata, the bacterial composition that is added to the wastewater solely comprises one or more bacterial strains, but does not include any co-cultures of the bacteria with heterotrophs. Despite the quantity of the bacteria disclosed in Hata, no co-culturing of the bacteria with the heterotrophs is disclosed. Hata basically only claims application of bacteria to water.

In Castaldi et al., the only source of bacteria is the treating agent that consists essentially of cultures of bacteria of the genus Thiobacillus in combination with denitrifying bacteria. On the other hand, if the treating agent in Castaldi et al. is considered as a source of bacteria, then there is no co-cultural blend that is being simultaneously applied to the wastewater in Castaldi et al. Therefore, in Castaldi et al., there is only one source of bacteria, and the final product is denitrification, via one application of one treating agent. In the present invention, there are two simultaneous sources via which a number of strains of bacteria are added individually and simultaneously.

SUMMARY OF THE INVENTION

A primary object of the invention is to devise an economically-feasible process for treating wastewater that contains BOD, COD and sulfides, minimizing sulfide releases to the atmosphere, such that the treated wastewater could be discharged into the environment or could be reused.

An additional object of the invention is to devise a process for treating wastewater that contains BOD, COD and sulfides by using previously-treated wastewater, such that all treated wastewater could be discharged into the environment or could be reused, minimizing sulfide releases to the atmosphere.

Another object of the invention is to devise a process for treating wastewater, containing BOD, COD and sulfides to an extent that the treated wastewater could be recycled back to the paper mill, minimizing sulfide releases to the atmosphere.

An additional object of this invention is to minimize equipment investment and operating capital that are needed in a process for treatment of wastewater from pulp and paper industries.

Additional objects and advantages of the invention will be set forth in part in a detailed description which follows, and in part will be obvious from the description, or may be learned by practice of the invention.

The present invention consists of a process for the biological treatment of wastewater exiting pulp and paper industries. This invention uses, as a first source, a number of strains of bacteria to remove or significantly reduce the COD, BOD and sulfides from the effluent of any pulping process. (To simplify the description of the present invention, "removal" or "minimizing" would implement removal or significant reduction.) As a second source, simultaneously and additionally, sulfides, COD and BOD are removed by an improved co-cultural blend comprising co-cultures of a number of strains of bacteria from the genus Thiobacillus or *Thiobacillus dentrificans* with heterotrophs, with the number of strains of Thiobacillus or of *Thiobacillus dentrificans* bacteria being cultured on thio-sulfides.

It is to be understood that the descriptions of this invention are exemplary and explanatory, but are not restrictive, of the invention. Other objects and advantages of this invention will become apparent from the following specification and from any accompanying charts, tables and examples.

BRIEF DESCRIPTION OF CHARTS, TABLES AND EXAMPLES

Any accompanying charts, tables and examples which are incorporated in and constitute a part of this specification, illustrate examples of preferred embodiments of the invention and, along with the description, serve to explain the principles of the invention.

DETAILED DESCRIPTION OF THE PREFERRED EMBODIMENT

The present invention provides a process for the biological treatment of wastewater containing sulfides. The present invention is particularly aimed at treating wastewater from pulping industries. The wastewater from pulping industries contains various forms of sulfides, sulfites and sulfates, as well as COD and BOD. As a first source of bacteria, a number of strains of bacteria are applied to the wastewater to minimize sulfide content of the wastewater. As a second source of bacteria, simultaneously and additionally an improved co-cultural blend comprising co-cultures of a number of strains of bacteria with heterotrophs are applied to the wastewater in order to minimize BOD and COD of the wastewater. This process can also remove less biologically difficult wastewater streams from the same facility that contain BOD, COD, TKN and ammonia.

The COD, BOD and sulfides are removed from the effluent water utilizing a preferred embodiment of the improved co-cultural blend that comprises co-cultures of heterotrophs with a number of strains of bacteria from the genus Thiobacillus. A number of strains of bacteria from the genus *Thiobacillus denitrificans* can also be used. Sulfides are specifically removed by a number of strains of the Thiobacillus bacteria or of the *Thiobacillus denitrificans* bacteria. COD and BOD are concurrently removed with the sulfides by the co-cultures of the number of strains of the Thiobacillus bacteria or of the *Thiobacillus denitrificans* bacteria with the heterotrophs. The heterotrophs are biologically acclimated to any species of bacteria to be removed. Acclimation reduces mycell toxicity of the heterotrophs so that the heterotrophs perform more efficiently and effectively. A biological acclimation and enrichment reactor can be used to accomplish acclimation of the heterotrophs. The acclimation ability and time will be dependent upon the initial quantity of the individual microorganisms and those parameters which control microorganism growth and reaction rates (such as pH, temperature and dissolved oxygen levels).

A parameter that controls the microorganism growth and reaction rates is the presence of certain chemicals, such as chemicals comprising ammonia and/or phosphate, as sources for feeding the microorganisms. Ammonia can be provided for the heterotrophs and the number of strains of bacteria by the breakdown of a solid TKN source. Ammonia can also be chemically added to the wastewater for feeding the number of strains of bacteria and the heterotrophs. Any additive, comprising phosphate (e.g. ammonia-phosphate, o-phosphate and mono-calcium phosphate which also serves as a source of soluble o-phosphate), that provides water-soluble phosphates can be added to the wastewater for feeding the number of strains of bacteria and the heterotrophs. A version of an ammonia-phosphate additive that is primarily used in aeration basins and wastewater lagoons is described below. This ammonia-phosphate additive is even effective in aeration systems that are totally deficient in both ammonia and soluble o-phosphate. The primary ingredients of the ammonia-phosphate additive are anhydrous ammonia, forms of urea, phosphate and clay. The additive comprises:

| | |
|---|---|
| Phosphate | 33%–37% |
| Ammonia Nitrogen | 33%–37% |
| Calcium | 2%–6% |
| Moisture | 1%–3% |
| Free acid | 1% |
| Fe and Al oxides | 2% |

The ammonia-phosphate additive has a bulk density of 52 lb./ft$^3$ and a pH (1% slurry) of 4 to 6 and is corrosive to iron, aluminum, copper and brass, thus requiring feed systems made of polyvinyl chloride (PVC), polyethylene or polypropylene. The ammonia-phosphate additive either goes into aqueous solution upon contact with water or slowly releases over time for continued effectiveness.

Meanwhile, a version of a high-phosphate additive that is used in aeration basins and wastewater lagoons to increase the soluble ortho-phosphate in aeration basins and wastewater lagoons comprises:

| | |
|---|---|
| $Ca(H_2PO_4)_2 \cdot H_2O$ | 84%–86% |
| Iron and aluminum oxides | 4%–5% |
| Free acid | 2%–4% |
| Moisture | 1%–3% |
| Magnesium compounds | 0.7%–1% |

The additive has a bulk density of 70 lb./ft$^3$ and a pH (1% slurry) of 3.1 to 3.2, being corrosive to iron, aluminum, copper and brass and, thus, requiring feed systems made of polyvinyl chloride (PVC), polyethylene, polypropylene or steel. The additive goes into aqueous solution upon contact with water and forms phosphoric acid upon contact with water. Due to the slow release of the additive from the bottom of the aeration basins and wastewater lagoons, the additive provides phosphate protection for days after being added to the wastewater.

Normally, the changes in the proportions of different groups of microorganisms can be estimated through routine sampling and chemical analysis of both wastewater feed and effluent, and measurements of wastewater feed flow rates, pH and dissolved oxygen uptake rates of the system mixed liquor. Typical chemical analyses of the wastewater feed and effluent detects COD, BOD and contents of sulfides, sulfates, sulfites and specific organics in the solution. Due to the existence of numerous reactions and steps in removing COD, BOD and sulfides, the biotreatment process should be controlled as much as possible. Regular measurements of various factors would be a requirement in achieving the desired results. Temperature is a factor that is important in controlling the reactions. The reaction kinetics can be controlled by setting the temperature within a range that is hospitable to the growth and reaction of all involved microorganisms.

Another controlling factor that should be measured through the biotreatment process is the pH and its range of variation. The preferred reaction kinetics are provided by assuring that the pH lies within a range hospitable to the growth and reaction of the involved microorganisms and that the microorganism activity is preserved at a sufficiently high level that significant amounts of contaminant species do not build up and leave the wastewater unreacted. To control pH of the sulfides during the application of the improved co-cultural blend comprising co-cultures of the heterotrophs with the Thiobacillus bacteria to the wastewater, magnesium oxide (MgO) is utilized along with caustic.

Sulfides can be biologically removed by using phototropic sulfur bacteria (resulting in production of sulfur). Sulfide can also be converted to sulfate by oxygen-consuming bacteria in activated sludge (i.e. aerobic conversion). In an aerobic reaction, in order to remove sulfides from the wastewater, sulfide is converted to sulfate:

$$S^- + 2\,O_2\,(aq) \xrightarrow[\text{AEROBIC CONDITIONS}]{\text{SULFUR ACTING MICROORGANISMS}} SO_4^-$$

Many bacteria of the genus Thiobacillus and of the genus *Thiobacillus denitrificans* are suitable sulfur-oxidizing bacteria for converting sulfide to sulfate in the above reaction. Aerobic conversion of sulfide proceeds much faster than phototropic conversion which is anaerobic and which requires light supply in a reactor. However, sulfide adversely effects the purification efficiency and sludge retention during aerobic purification of wastewater based on a process wherein activated sludge is used. Presence of sulfide-oxidizing, filamentous strains of bacteria in the treatment plants is one factor in the adverse effects of sulfide. The filamentous strains of bacteria hamper an efficient settlement of sludge, causing washing out of the sludge. As a result, the activity of the waste treatment plant and, thus, the purification performance of the plant diminish. The decrease in efficiency of sludge settlement causes an increase in the COD load and in the BOD load and, therefore, an increase of levies.

The improved co-cultural blend that is introduced by the present invention is designed to remove sulfides (but not sulfates), COD and BOD from sulfide-containing effluent discharges of pulping processes. During removal of the sulfides, the improved co-cultural blend uses sulfur compounds as sources of energy. The improved co-cultural blend enhances the redox reactions of sulfur and is cultured on thio-sulfides. The improved co-cultural blend comprises a unique combination of the number of strains of bacteria (preferably Thiobacillus or *Thiobacillus denitrificans* bacteria that are also raised on thio-sulfides). The improved co-cultural blend comprises unique versions of co-cultures of the number of strains of bacteria with the heterotrophs and is formed by an improved inoculation and augmentation program. In a most preferred embodiment, at least about 20%, and preferably between approximately 40% to approximately 60%, of the improved co-cultural blend comprise the co-cultures of the number of strains of bacteria (preferably the Thiobacillus bacteria) and the heterotrophs. The improved co-cultural blend is introduced into the wastewaters either directly or via a biological enricher reactor.

The improved co-cultural blend has the ability to grow under reduced oxygen conditions and at lower than neutral pH ranges. However, the improved co-cultural blend does not generate pH levels that are as low as the pH levels generated by sulfate-reducing bacteria (SRB). Despite being an obligate aerobe, the improved co-cultural blend is able to flourish at interfaces of anaerobic environments where the improved co-cultural blend obtains energy by absorbing and detoxifying sulfur dioxide ($SO_2$), hydrogen sulfide ($H_2S$), carbon disulfide ($CS_2$) and carbon oxy-sulfide (COS). Sulfides are combined with low levels of available oxygen to generate neutral products (sulfur and water), along with metabolic energy for the improved co-cultural blend. The improved co-cultural blend enhances the redox reactions between sulfides and elemental sulfur under aerobic, including and periodically being accompanied by anoxic, conditions:

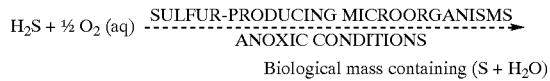

$$H_2S + \tfrac{1}{2} O_2 \text{ (aq)} \xrightarrow[\text{ANOXIC CONDITIONS}]{\text{SULFUR-PRODUCING MICROORGANISMS}} \text{Biological mass containing } (S + H_2O)$$

A major advantage of the improved co-cultural blend used in the present invention is that the improved co-cultural blend prevents the formation of sulfuric acid from sulfur.

The biological oxygen demand, which may be present in the wastewater, can be oxidized by the co-cultural heterotrophic microorganisms:

$$a\,BOD + b\,O_2 \text{ (aq)} \xrightarrow[\text{AEROBIC CONDITIONS}]{\text{CO-CULTURAL HETEROTROPHIC MICROORGANISMS}} c\,H_2O + b\,CO_2$$

BOD can be supplied as either or both aqueous BOD and the BOD represented by the microorganisms and available for reaction through endogenous respiration. The appropriate BOD can arise in the system basically in two ways:

In the first case, supplemental BOD can be provided by affirmatively adding appropriate quantities of essentially any water-soluble organic material at concentrations up to the limit of their water solubility.

In the second case, the wastewater feed will have sufficiently high levels of biological oxygen demand in the form of dissolved organics and system microorganisms that, at the desired system reaction rate, at least a stoichiometric quantity of the biological oxygen demand in relation to the amount required for the necessary reactions is present. The biological oxygen demand is provided by endogenous respiration of microorganisms in the anoxic region of sludge agglomerates and by permeation of organic material into the anoxic region of sludge agglomerates. Due to the existence of insufficient amounts of oxygen, the oxidation of the organic material occurs in a microbial manner.

EXAMPLE

A bench-scale biodegradation study was performed to determine the biological reduction of sulfide concentrations in wastewater streams of a pulping plant.

The efficiency of biologically-reducing sulfide concentrations in effluents of a bleach plant was investigated by utilizing a bench-scale respirometric screening protocol. The specific goal of the research work was to ascertain that a bioaugmentation strategy could be employed to reduce the amount of odiferous compounds (both organic and inorganic) released into the atmosphere by a fiber pond and an aeration basin. Concentrations of free sulfides in a gaseous and aqueous solution were examined in the control samples and in the bioaugmentation samples.

Aqueous and sludge liter samples were obtained from a fiber pond and an aeration basin from a large paper-manufacturing facility that incorporated a bleaching process. The fiber pond and aeration basin samples were composited separately into two separate 2½ gallon plastic containers with airtight lids and refrigerated at 37° F. Samples were pulled from the fiber pond composite and the aeration basin composite and analyzed for total (free) sulfides. A 2-liter aliquot was pulled from the fiber pond composite and from the aeration basin composite samples. These samples were to be utilized for the following bench scale set-ups after they were allowed to warm up to ambient room temperature.

The study on the fiber pond composite sample was performed in a bench-scale set-up (in a "glove box" environment). In a 4-liter reactor, the fiber pond composite was mixed with the following bioaugmentation compounds: 20 ml. of Polybac Lignobac-40S slurry, one gram of sodium nitrate and five ml. of Polybac-N slurry. The bench-scale reactor was sealed after the mixing of the bioaugmentation compounds. A headspace of two liters was utilized with additional capacity employed via a gas trap into an expandable membrane. This study was concluded after 22 days.

The study on the aeration basin composite sample was performed in a bench-scale set-up (in a "glove box" environment). In a 4.2-liter batch reactor, the aeration basin composite was mixed with the following components: 20 ml. of Polybac Lignobac-40S slurry mixed with a nitrate slurry and 5 ml. of Polybac-N slurry. The bench-scale reactor was enclosed in the "glove box" after the composite was mixed with the bioaugmentation components. Aeration was provided by a fine bubble diffuser blend from a laboratory air supply.

The application of EPA 376.1 Method was an analytical requirement in measuring the following total sulfide levels. The following data, indicating the total level of sulfides, were obtained:

| SAMPLING LOCATION | TIME OF SAMPLING | RESULTING AMOUNT OF TOTAL SULFIDES (MG/L) |
| --- | --- | --- |
| FP1 (Fiber Pond-- Sample 1) | 10:00 a.m. | 640 |
| FP2 (Fiber Pond-- Sample 2) | 10:00 a.m. | −320* |
| AB1 (Aeration Basin-- Sample 1) | 10:10 a.m. | −360* |
| AB2 (Aeration Basin-- Sample 2) | 10:10 a.m. | −640* |
| FP5 (Fiber Pond-- Sample 5) (pH adjusted with NaOH) | 10:30 a.m. | <40 |
| AB5 (Aeration Basin-- Sample 5) (pH adjusted with NaOH) | 10:30 a.m. | <40 |

*Please note that a negative value for the total sulfide level indicates reducing capacity of the sample.

As indicated above, there was a significant reduction of sulfides. Also, per a purge and trap analysis that was performed, odors were primarily from the resulting amount of total sulfides indicated above, not from mercaptans. Decreasing total sulfide levels resulted in significant odor reductions after just 3 days.

Four sets of purge and trap tests were performed. The application of EPA 624 Method was an analytical requirement for measuring the levels of the components in the purge and trap tests. An FP3 sample and an FP4 sample, both obtained at 10:05 a.m., underwent a set of purge and trap tests. An AB3 sample and an AB4 sample, both obtained at 10:20 a.m., underwent a set of purge and trap tests as well.

Applying gas chromatography scans, the following results were obtained in each four purge and trap test, indicating the level of the compounds at the time of retrieval of the samples:

| COMPOUND | RESULTING AMOUNT (ug/L) | LIMIT OF QUANTITATION (ug/L) |
|---|---|---|
| chloromethane | <100 | 100 |
| vinyl chloride | <100 | 100 |
| bromomethane | <100 | 100 |
| chloroethane | <100 | 100 |
| trichlorofluoromethane | <10 | 10 |
| 1,1-dichloroethene | <10 | 10 |
| methylene chloride | <10 | 10 |
| trans-1,2-dichloroethene | <10 | 10 |
| 1,1-dichloroethane | <10 | 10 |
| chloroform | <10 | 10 |
| 1,2-dichloroethane | <10 | 10 |
| 1,1,1-trichloroethane | <10 | 10 |
| carbon tetrachloride | <10 | 10 |
| benzene | <10 | 10 |
| trichloroethene | <10 | 10 |
| 1,2-dichloropropane | <10 | 10 |
| bromodichloromethane | <10 | 10 |
| cis-1,3-dichloropropene | <10 | 10 |
| trans-1,3-dichloropropene | <10 | 10 |
| 1,1,2-trichloroethane | <10 | 10 |
| dibromochloromethane | <10 | 10 |
| bromoform | <10 | 10 |
| toluene | <10 | 10 |
| tetrachloroethene | <10 | 10 |
| chlorobenzene | <10 | 10 |
| ethylbenzene | <10 | 10 |
| m/p-xylene | <10 | 10 |
| o-xylene | <10 | 10 |
| 1,1,2,2-tetrachloroethane | <10 | 10 |
| 1,3-dichlorobenzene | <10 | 10 |
| 1,4-dichlorobenzene | <10 | 10 |
| 1,2-dichlorobenzene | <10 | 10 |

Therefore, the reduction of sulfides resulted in the reduction of odors.

Therefore, the present invention provides two sources of a number of strains of bacteria that are not provided by any existing patent and that provide the number of strains of bacteria simultaneously to wastewater.

Certain objects are set forth above and made apparent from the foregoing description and examples. However, since certain changes may be made in the above description and examples without departing from the scope of the invention, it is intended that all matters contained in the foregoing description and examples shall be interpreted as illustrative only of the principles of the invention and not in a limiting sense. With respect to the above description and examples then, it is to be realized that any descriptions and examples deemed readily apparent and obvious to one skilled in the art and all equivalent relationships to those stated in the examples and described in the specification are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A process for biologically treating wastewater containing sulfides of such concentration that sulfides of an objectionable odor are generated into the atmosphere, the process reducing concentration of said sulfides in the wastewater and in the atmosphere and reducing formation of sulfuric acid from sulfur, said process comprising:

(a) as a first source of bacteria, applying a number of strains of bacteria from the genus Thiobacillus to the wastewater to minimize sulfide content of the wastewater by converting sulfides to sulfur incorporated in the biomass of the Thiobacillus; and (b) as a second source of bacteria, additionally applying a co-cultural blend, the blend formed by at least one of the number of strains of bacteria from the genus Thiobacillus with at least one heterotroph, to the wastewater, the blend able to grow under reduced oxygen conditions, to convert sulfides to sulfur incorporated in the biomass of the Thiobacillus and to minimize chemical oxygen demand and biological oxygen demand of the wastewater.

2. The process for biologically treating wastewater according to 1, wherein the number of strains of bacteria are co-cultured on thio-sulfides.

3. The process for biologically treating wastewater according to claim 1, wherein the number of strains of bacteria are from the genus *Thiobacillus denitrificans*.

4. The process for biologically treating wastewater according to claim 2, wherein the number of strains of bacteria are cultured on thio-sulfides.

5. The process for biologically treating wastewater according to claim 1, wherein at least approximately 20% of the improved co-cultural blend comprises the co-cultures of the number of strains of Thiobacillus bacteria with the heterotrophs.

6. The process for biologically treating wastewater according to claim 5, wherein at least approximately 20% of the improved co-cultural blend comprises the co-cultures of the number of strains of Thiobacillus bacteria, which are raised on thio-sulfides, with the heterotrophs.

7. The process for biologically treating wastewater according to claim 5, wherein between approximately 40% and approximately 60% of the improved co-cultural blend comprises the co-cultures of the number of strains of Thiobacillus bacteria with the heterotrophs.

8. The process for biologically treating wastewater according to claim 7, wherein between approximately 40% and approximately 60% of the improved co-cultural blend comprises the co-cultures of the number of strains of Thiobacillus bacteria, which are raised on thio-sulfides, with the heterotrophs.

9. The process for biologically treating wastewater according to claim 1, wherein sulfide is converted to sulfate in an aerobic reaction by oxygen-consuming bacteria cultures.

10. The process for biologically treating wastewater according to claim 9, wherein sulfide is converted to sulfur in biomass in an anoxic reaction.

11. The process for biologically treating wastewater according to claim 1, wherein the heterotrophs are acclimated to any species to be removed by using a number of biological acclimation and enrichment reactors that are needed for reducing mycell toxicity to and increasing effectiveness of the number of strains of bacteria.

12. The process for biologically treating wastewater according to claim 11, wherein the acclimation ability and time depends upon starting quantities of the species and upon any parameters which control growth and reaction rates of the species, said parameters including pH, temperature, wastewater feed flow rates and dissolved oxygen levels.

13. The process for biologically treating wastewater according to claim 1, wherein magnesium oxide and caustic are used to control pH of the sulfides during application of the improved co-cultural blend to the wastewater.

14. The process for biologically treating wastewater according to claim 1, wherein ammonia is provided to the number of strains of the bacteria by the breakdown of total Kjeldahl nitrogen.

15. The process for biologically treating wastewater according to claim 1, wherein an additive comprising ammonia is chemically added to the wastewater for feeding the number of strains of bacteria.

16. The process for biologically treating wastewater according to claim 1, wherein an additive comprising phosphate that provides water-soluble phosphate is added to the wastewater.

17. The process for biologically treating wastewater according to claim 16, wherein an additive comprising ammonia-phosphate is applied to the wastewater as a source of ammonia.

18. The process for biologically treating wastewater according to claim 16, wherein an additive comprising mono-calcium phosphate is applied to the wastewater as a source of soluble o-phosphate.

19. The process for biologically treating wastewater according to claim 1, wherein the wastewater to be treated is from pulp and paper industries.

20. The process for biologically treating wastewater according to claim 1, wherein any mercaptan content of the wastewater is minimized.

21. The process for biologically treating wastewater according to claim 1, wherein the co-cultures of the number of strains of bacteria with the heterotrophs are grown under reduced oxygen conditions and lower than neutral pH ranges.

22. The process for biologically treating wastewater according to claim 1, wherein nitrate salts are used to provide an electron donor source for the number of strains of bacteria that are from the genus Thiobacillus.

23. The process for biologically treating wastewater according to claim 1, wherein nitrite salts are used to provide an electron donor source for the number of strains of bacteria that are from the genus Thiobacillus.

24. The process for biologically treating wastewater according to claim 1, wherein the wastewater contains organic sulfides.

\* \* \* \* \*